Figure 1:
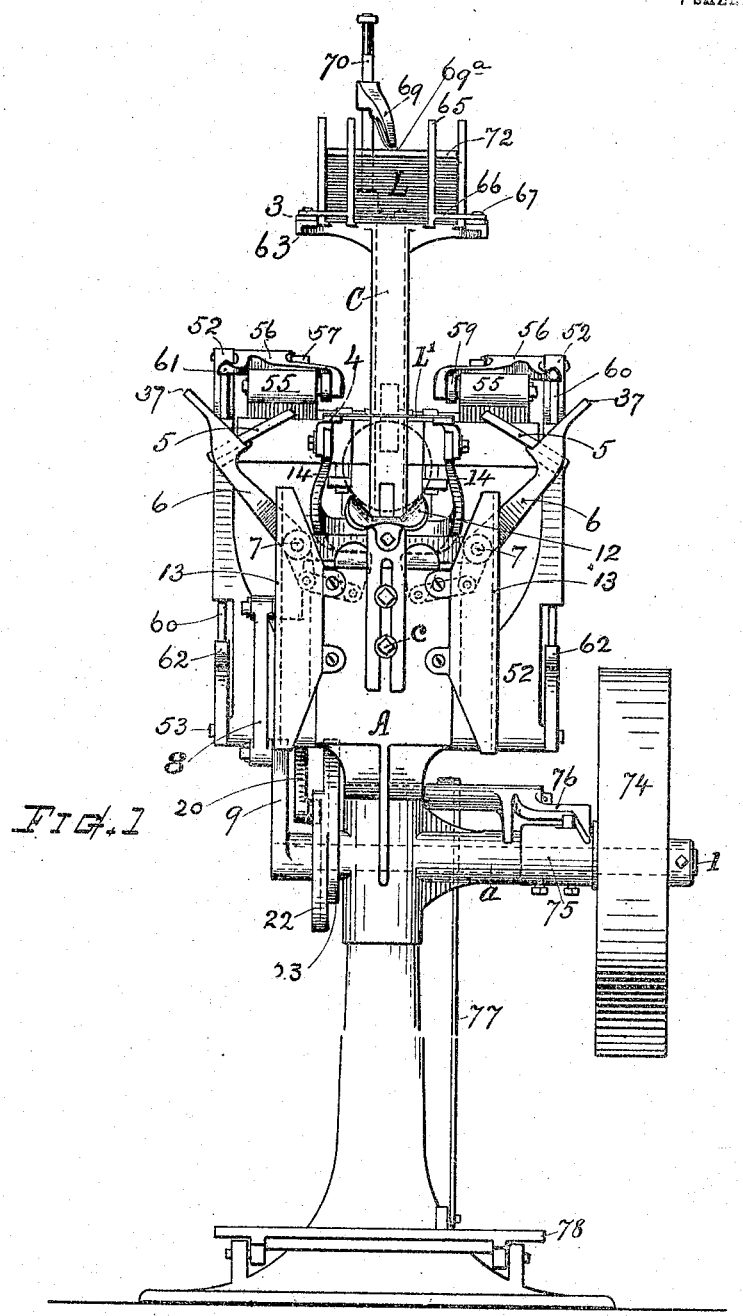

F. O. WOODLAND.
LABELING MACHINE.
APPLICATION FILED APR. 24, 1903.

937,403.

Patented Oct. 19, 1909.
7 SHEETS—SHEET 1.

Witnesses
Fred N. Flinn
Simion E. King

Inventor
Frank O. Woodland
By Chas. H. Burleigh
Attorney

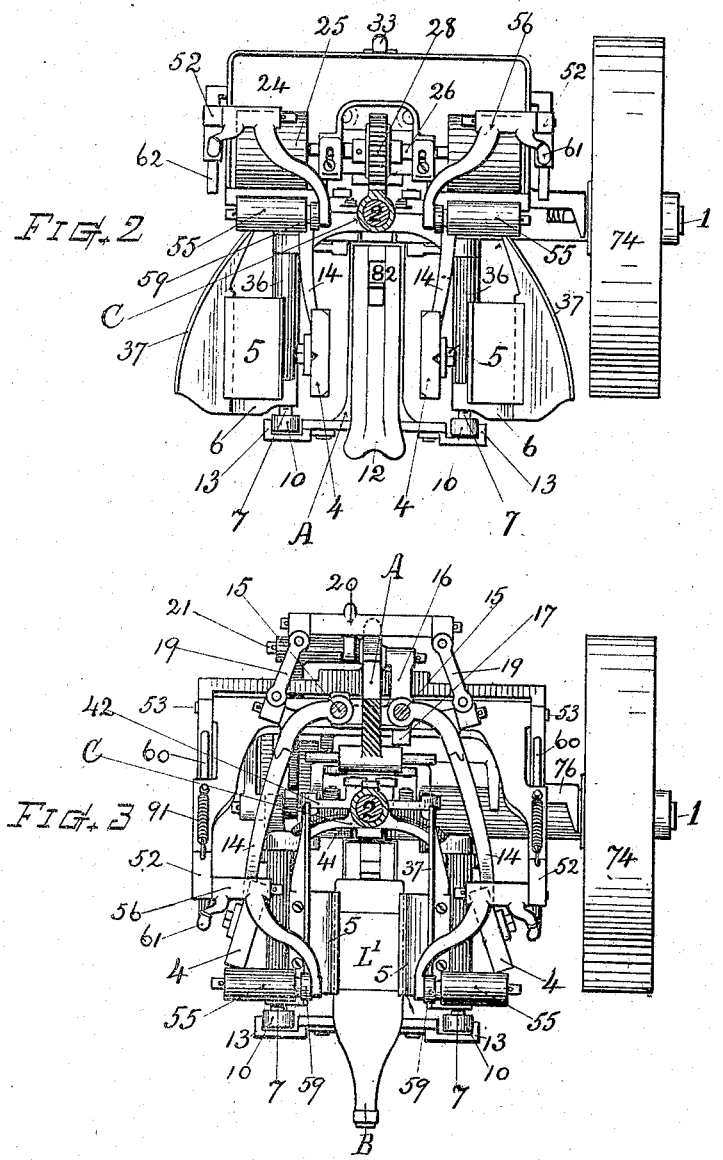

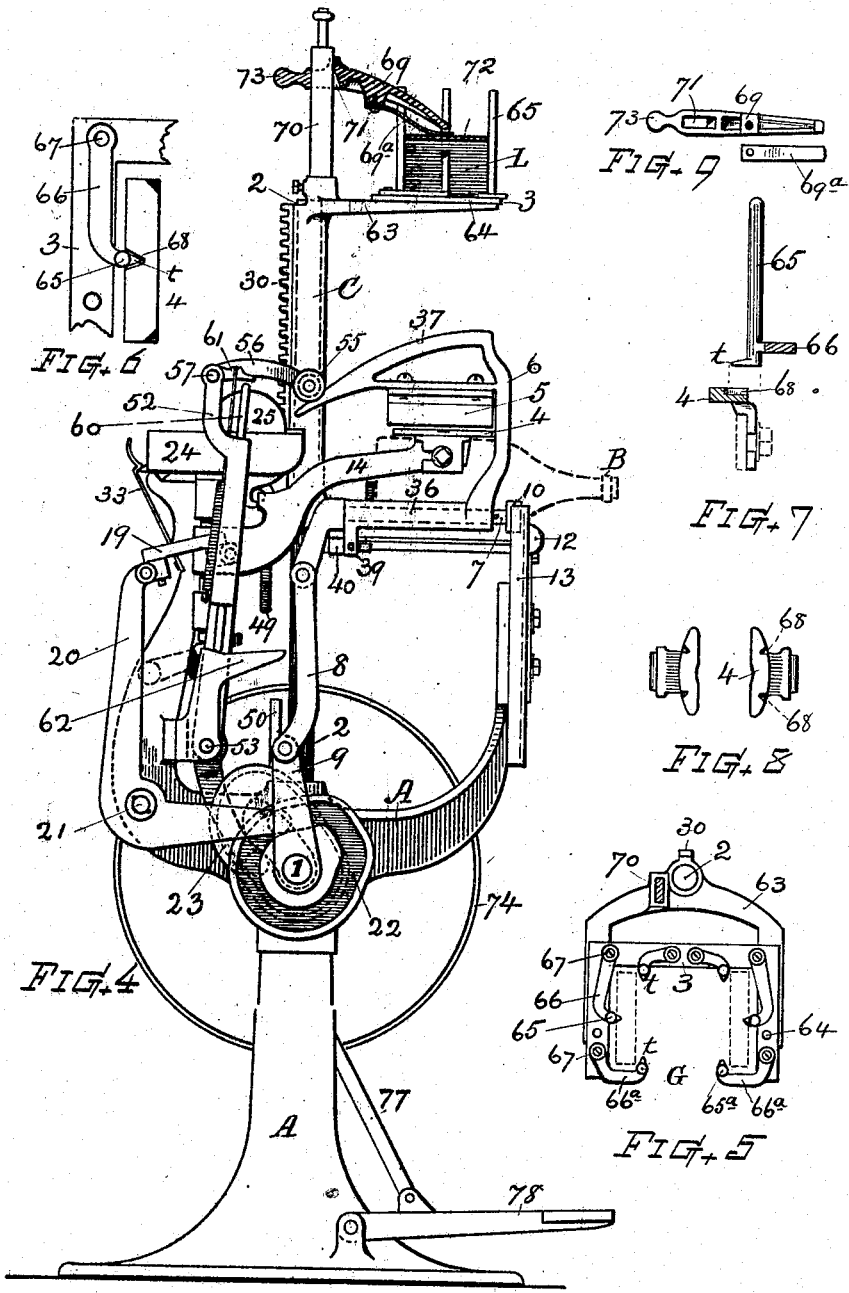

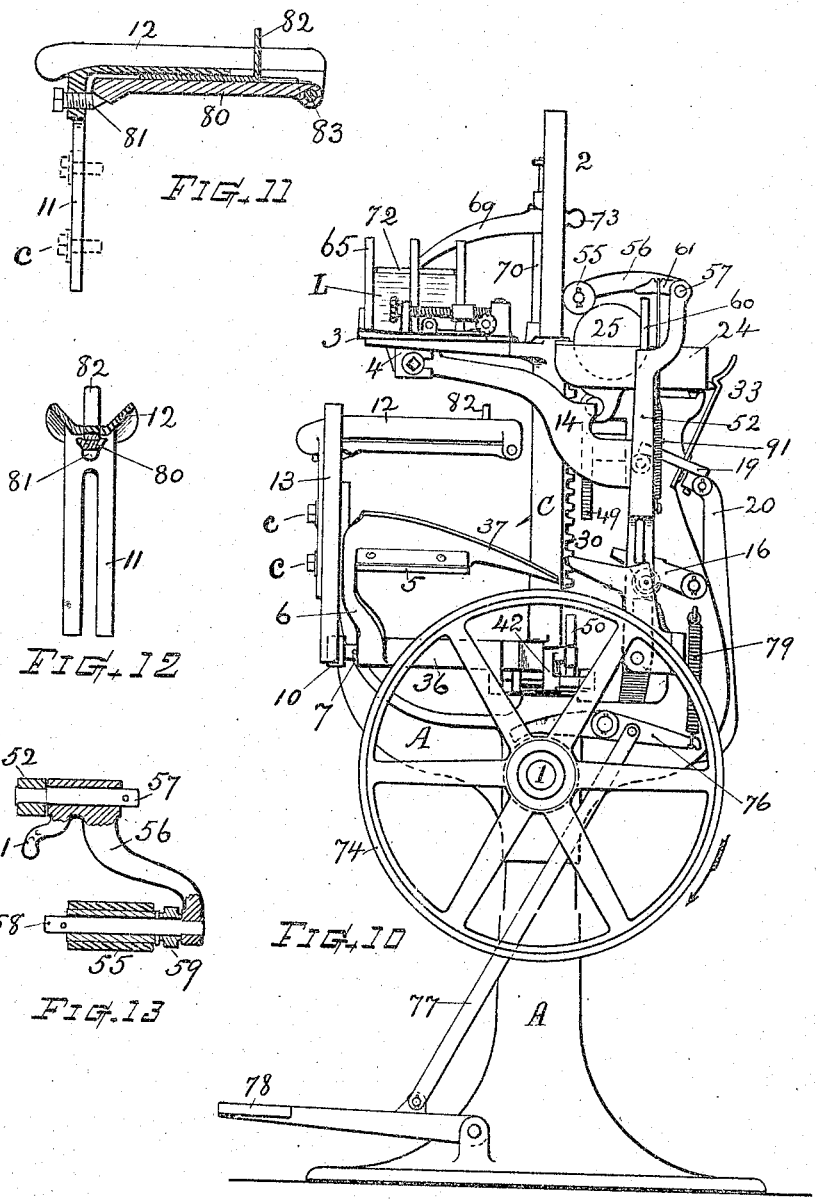

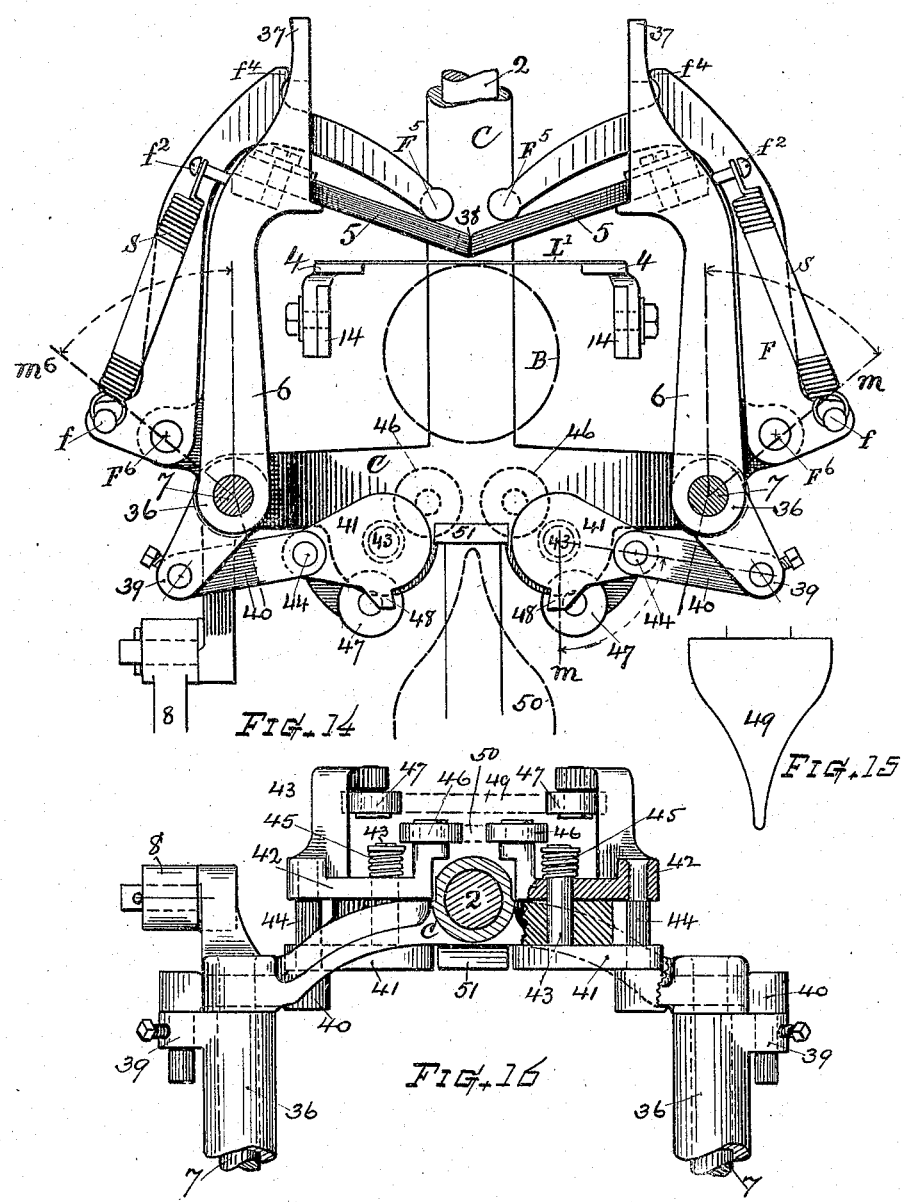

F. O. WOODLAND.
LABELING MACHINE.
APPLICATION FILED APR. 24, 1903.
937,403.
Patented Oct. 19, 1909.
7 SHEETS—SHEET 6.
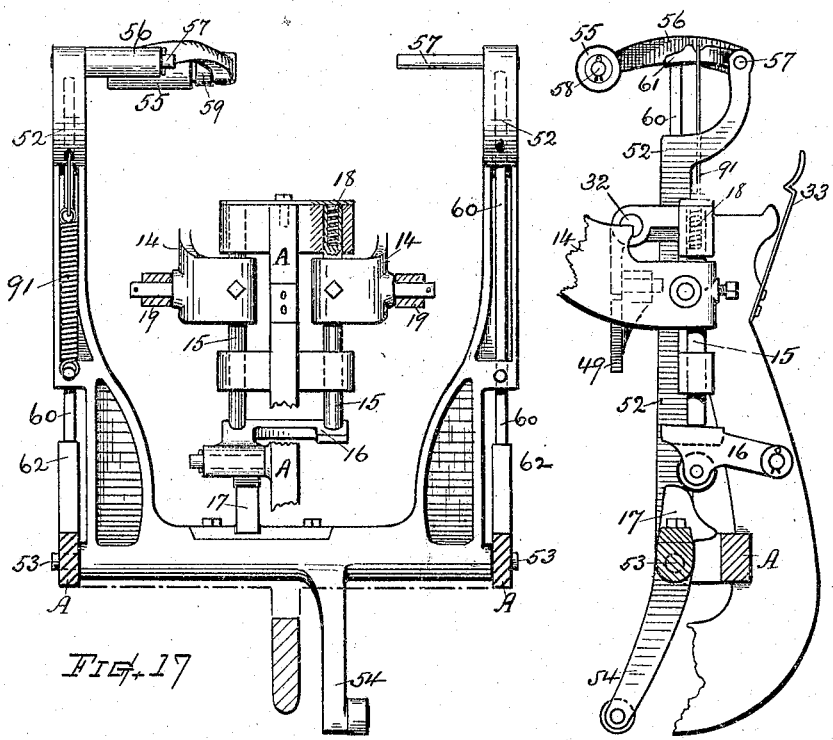
Fig. 17
Fig. 18
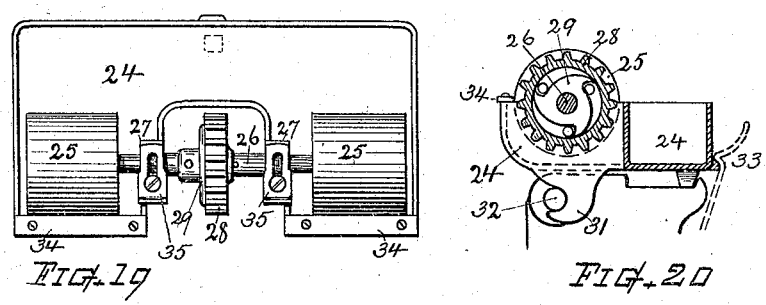
Fig. 19
Fig. 20
Witnesses
Fred H. Flinn
Simeon E. King
Inventor
Frank O. Woodland
By Chas. H. Burleigh
Attorney

F. O. WOODLAND.
LABELING MACHINE.
APPLICATION FILED APR. 24, 1903.

937,403.

Patented Oct. 19, 1909.
7 SHEETS—SHEET 7.

Witnesses
Fred H. Flinn
Simeon E. King

Inventor
Frank O. Woodland
By Chas. H. Burleigh
Attorney

UNITED STATES PATENT OFFICE.

FRANK O. WOODLAND, OF WORCESTER, MASSACHUSETTS.

LABELING-MACHINE.

937,403.

Specification of Letters Patent.

Patented Oct. 19, 1909.

Application filed April 24, 1903. Serial No. 154,166.

*To all whom it may concern:*

Be it known that I, FRANK O. WOODLAND, a citizen of the United States, residing at Worcester, in the county of Worcester and State of Massachusetts, have invented a new and useful Labeling-Machine, of which the following, together with the accompanying drawings, is a specification sufficiently full, clear, and exact to enable persons skilled in the art to which this invention appertains to make and use the same.

The object of my present invention is to provide a practical and efficient mechanism for affixing labels to bottles and articles to which labels can be applied in similar manner, and to render said mechanism convenient for attendance and capable of rapid action, while affording ample time for the attendant to remove and replace the bottles while the machine is in operation.

Another object is to provide, in a machine for the purpose specified, label-feeding mechanism that will obviate liability of occasionally dropping, skipping or displacing of labels; and to render the machine sure and accurate in its presentation and affixment of the labels.

My invention, in its embodiment comprises a stationary supporter for the bottle or article to be labeled, an upwardly and downwardly movable label holder, from the bottom of which the labels are delivered directly over said bottle supporter, a pair of laterally movable pickers or paste applying members, upon which the label-holder descends and which receive the labels singly therefrom; a pair of wiping-on devices that have upward and downward motion and lateral or outward swinging action, and which also serve for primarily advancing and gripping the label to the bottle surface; a paste-box, or reservoir with delivering rolls, a reciprocatory frame or oscillator carrying rollers for transferring a suitable film of paste or adhesive from the delivering roll to the paste applying pickers, a suitable supporting frame and means for imparting to the several above mentioned parts power and motion for performing their various functions in their proper time.

My invention also comprises features of novelty in the construction of the mechanism in various parts, and in the combination and mode of operation thereof, as will be more fully explained; the peculiar features of my invention being hereinafter specified in detail, and the particular subject matter claimed expressly defined in the summary.

Figure 21:
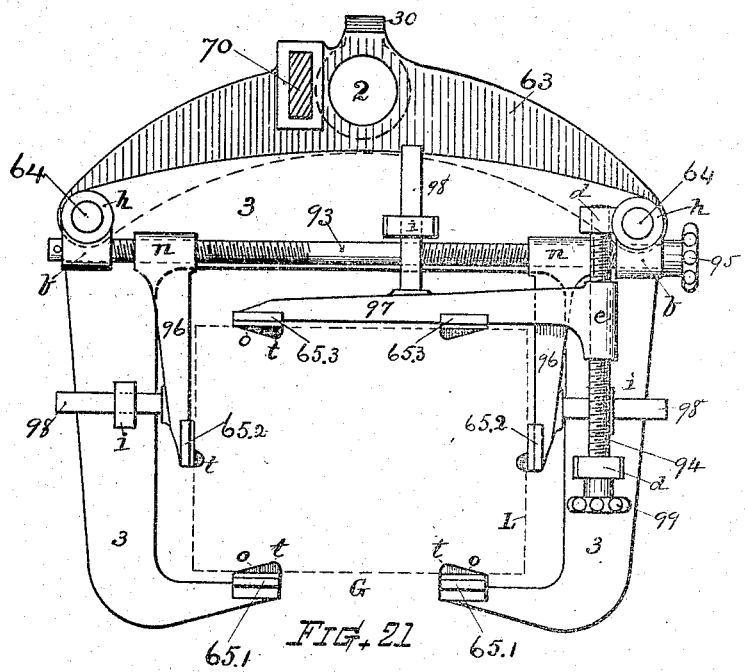
Figure 22:
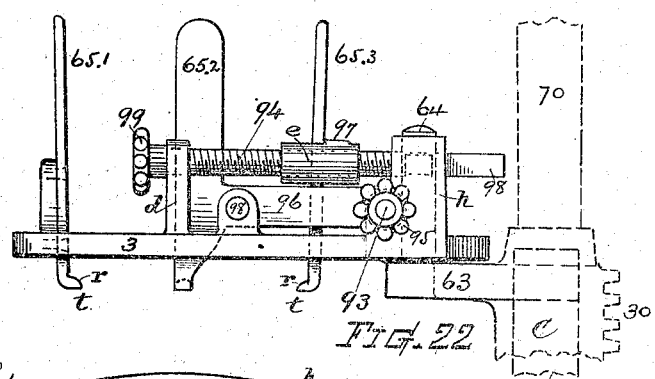
Figure 23:
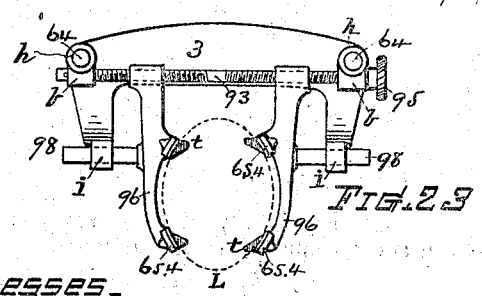

In the drawings, Figure 1 represents a front view of a labeling machine embodying my invention. Fig. 2 represents a plan view, with the label-holder omitted in order to more clearly show the pasting and wiper mechanisms. Fig. 3 represents a plan view, partly in section, and with the paste-box omitted, showing the paste-transferring rollers at their forward position and the wipers in the act of wiping a label upon the bottle. Fig. 4 represents a side view at the left hand side of the machine, showing the parts in position, as at the commencement of the wiping-on movement. Fig. 5 is a separate plan view of an open label-holder. Figs. 6 and 7 are fragmentary detail views, on larger scale, showing a label-holder pin and its relation to the pasting picker plate. Fig. 8 is a separate plan view of a pair of pasters or pickers as adapted for oval shaped labels. Fig. 9 is a bottom view of the label clamp or follower finger. Fig. 10 represents a side view at the right hand side of the machine, showing the parts as with wipers and label-holder mechanism at depressed position. Fig. 11 is a vertical central section of the bottle-supporter. Fig. 12 is a transverse section of the bottle supporter. Fig. 13 is a separate sectional view of a paste-transferring roller and its hinging arm. Fig. 14 represents, on a larger scale, the detail of the wipers and wiper-actuating mechanism. Fig. 15 illustrates the shape of the upper cam device therefor. Fig. 16 is a fragmentary plan view showing the details of the wiper-actuating mechanism. Fig. 17 represents a rear view of the rocker or arms, and appurtenant devices, that support the paste-transferring rollers, and the means for imparting vertical movement to the picker arms. Fig. 18 represents a fragmentary side and sectional view of the same. Fig. 19 represents a separate plan view of the paste-box, the paste-delivering roll and means for operating said roll, and Fig. 20 is a transverse section of the same through the roll-operating gear. Fig. 21 is a plan view showing the label-supply-holder as provided with screw-operated mechanism for adjusting the label-supporting guides or pins for accommodating different sizes of labels. Fig. 22 is a side view of the same, and Fig. 23 is a plan view, drawn to smaller scale, showing my adjustable open-bottomed label-holder as adapted for different sizes of labels of rounded or oval shapes.

Referring to the drawings, the letter A indicates the main frame which is preferably formed as a column or standard, having a broad base at its foot, and with its upper part made with front and rear branches or upwardly directed arms, a transverse bearing *a* for the operating shaft, and a central guide-rod 2 rigidly fixed in and projecting above the top of the columnar portion of said frame.

C indicates an upwardly and downwardly movable frame, slide, or carrier guided upon the rod 2, and having at its upper end means for retaining a label-holder 3 supported thereon; and at its lower end carrying the wiper mechanism, which comprises, as shown, a pair of oppositely disposed flexible wipers 5, their laterally movable supports or swinging arms 6 mounted upon forwardly projecting shafts or pivoting axles 7 fixed in the lower part or cross-head of said carrier, and means for imparting the lateral movement to said wipers, as will be hereinafter explained. The carrier-slide C and parts connected therewith are moved up and down by suitable means, which in the present instance consists of a connecting rod 8, and a crank 9 on the end of the operating shaft, as best shown in Figs. 1 and 4.

The front projecting ends of the wiper-pivoting axles are preferably each provided with an antifriction roll 10 that runs against a guide 13 formed upon or attached to the front portion of the frame; the two guides being in parallel upright relation and adapted to sustain the axles against lateral pressure and outward spread as the carrier-slide and wiper mechanisms are moved up and down. Said rolls and guides are not essential to the labeling operation of the machine, but give greater stability to the wiper supports and render the mechanism more durable.

The bottle supporter or rest 12 is secured at stationary position upon the front part of the frame, and is adjustable for different sizes of bottles by loosening its attaching screws *c* which are arranged through a slot in the arm 11 of the rest and threaded into the frame, as best shown in Figs. 1, 10 and 11.

Paste-applying plates or pickers 4 are provided for picking off or receiving single labels from the label-holder and supporting the label disposed above the bottle rest preparatory to its affixment to the bottle or article placed upon said rest. Said pickers are arranged to have a lateral movement for taking them out of the way of the wipers as the latter are brought into action, and for shifting said pickers into the path of devices whereby paste is transferred thereto. For this purpose there is preferably provided a pair of opposite laterally swinging picker-arms 14 supported at their rear ends upon upright pivot-rods 15 arranged in suitable bearings on the frame and adapted to have pivotal and vertical action therein. Said pivot-rods stand upon a swing-plate or lever 16 horizontally pivoted on the rear part of the frame and having a boss or friction roller that rests upon a cam 17 whereby the parts are upheld. The top ends of the pivot rods are each recessed and provided with a spring 18 that exerts a depressing force for moving the pivot-rod in opposition to the cam, so that when the cam surface recedes the pivot-rods, picker-arms and pickers have a corresponding downward movement, and vice versa.

The picker arms are provided with outstanding joint devices, and are respectively connected by links 19 with the head of a swinging angle-lever 20 fulcrumed on the frame, as at 21, and having its lower arm provided with a stud or roll that engages in the groove of a cam 22 (see Fig. 4) on the operating shaft 1, whereby the picker-arms are moved at the proper time with a lateral swinging action. The links 19 connecting the picker-arms 14 and lever 20, are best provided with dual or universal joint devices at each end to accommodate the compound movements without cramping.

The paste-applying pickers 4 are detachably secured to the fore ends of the picker-arms in the manner illustrated; such pickers may be formed to correspond with the shapes of different labels, as square, (see Fig. 2) or oval, (see Fig. 8) or other form; the same to be interchanged as required.

The paste-box or reservoir 24, for containing the supply of adhesive material, is preferably constructed in the form shown, (see Figs. 19 and 20) with two forwardly extending interior bays and an exterior space between them; the rear portion of the reservoir connecting the two bays with each other as a single paste-containing receptacle. Within each bay there is arranged a paste-delivering roll 25. The two rolls are best united by a shaft or axle 26 that turns in bearings 27 disposed at the edges of the box. Mounted upon the paste-roll axle there is a wheel or gear 28 and a ratchet or frictional clutch device 29 combined in such manner that it permits free independent rotation of the gear wheel when said gear revolves in one direction, but clutches it to the axle and effects rotation of the paste-delivering rolls when the gear is revolved in the other direction. A reciprocating actuator means is combined with the wheel or gear 28, which actuator in the present instance consists of a toothed rack 30 arranged upon the back of the carrier slide C; the gear being herein shown as disposed centrally upon the roll axle and within the space between the two bays.

The paste-box is supported upon the rear part of the frame, with the gear 28 in mesh with the toothed rack upon the back of the movable slide; so that when said slide is moved upward the paste-delivering rolls are rotated, but when said slide is moved downward, the gear being released by the ratchet devices, said rolls are allowed to remain idle. The under side of the paste-box is provided with hooks or lugs 31 that lock under pins or studs 32 fixed in the frame, and with a seating lug that rests upon the frame; so that the box, while having a secure support, can be readily removed by merely lifting it off and again replacing in position when desired. A projecting lip can be formed on the rear edge of the box, and a thumb-spring latch 33 attached to the frame and adapted to latch over said lip, in the manner shown, for retaining the paste box more securely in place, if in any instance desired.

Scraper devices 34 are provided on the front edge of the paste-box bays for gaging the supply of paste upon the face of the delivering rolls. The bearings 27 for the paste-roll axle 26 are best provided with a sliding cap 35 that can be moved for releasing the axle so that the paste-delivering rolls can be quickly removed and replaced when desired for cleaning or other purpose.

The numeral 5 indicates the wipers which consist of strong plates of moderately flexible vulcanized rubber, or other suitable resilient material, arranged as an oppositely disposed pair, each wiper having its outer edge rigidly secured to the wiper-arm 6, while its inner edge is free for smoothing the label upon the bottle surface. The wiper-arms 6 are respectively provided with bearing sleeves 36 mounted upon the forwardly projecting shafts or axis-pins 7 fixed to the lower part of the carrier slide. Said wiper-arms are formed with their tops or upper portions, whereon the wipers are supported, rearwardly overhanging, or in such manner as will afford space for the lateral movement or swing of the picker-arms and pickers from beneath the wipers without interference with the wiper-arms. The tops of the wiper-arms are formed with rearward extensions and provided with guide surfaces or cam portions 37, the purpose of which is hereinafter explained. The seats of the wipers upon the arms are formed horizontal from front to rear, but are transversely inclined in opposite relation, so that the wipers fixed thereto when brought together at their inner ends, stand at angular positions with their free edges in advance of their attached edges, the adjacent edges, if desired, touching and bracing against each other and forming a downwardly pointed V-shaped presentation, as at 38, along the central axis above the bottle and label position. (See Fig. 14.) By this angular disposition of the wipers the wipers are made to serve as a label-gripping means, for primarily clamping or retaining the label in place against the bottle surface while the pickers 4 move off from the ends of the label, preparatory to the wiping-on movement, which is accomplished by a continued downward movement of the wiper-arms, which movement first causes a reversal of the angular presentation of the wiper flaps and their backward flexure as they are drawn past the sides of the bottle, which lies stationary upon the rest, by the downward movement of the carrier-slide C. In this mechanism the wipers are adapted to act in closed relation while passing the bottle-rest in one direction, and to then separate and act in open relation while passing said bottle rest in the opposite direction.

When passing downward the wiper-arms are firmly supported with the wipers in closed relation, as best indicated in Figs. 3 and 14; they are then caused to swing outward, spreading or opening the wipers apart laterally, and are moved upward in spread or open relation, as indicated in Figs. 1 and 2, and by dotted lines on Fig. 14. For effecting this action I preferably employ mechanism, such as is best shown in Figs. 14 and 16, which is organized as follows: The rocking sleeve 36, which supports the wiper-arm, is provided with a crank or ear 39 and said ear is connected by a link-bar 40 with a pivoted tumbler member 41 mounted on a cross-bar $c$ of the slide frame C. The tumbler is formed with a front member and a rear member 42 united to move in unison by the pivot stud 43 and by the joint-pin 44. A spring 45 is arranged about the pivot for drawing the two tumbler members together and creating frictional resistance against the surface of the supporting part. The rear tumbler member 42 is provided with arms having mounted thereon rolls 46 and 47, which rolls are disposed in different planes and are respectively adapted to run against cams 49 and 50 at the upper and lower limits of the slide action. The approximate form and direction of these cams are shown in Fig. 14, whereon is outlined the shape of the lower cam 50, and in Fig. 15 which indicates the shape of the upper cam 49. The tumbler devices for the respective wiper-arms are made and disposed in right and left order, and their engaging studs or rolls act against the opposite edges of the cams, giving uniform right and left action to the respective wipers.

When the slide moves upward and approaches its extreme limit, the rolls 47 striking the cam 49, which is at the upper limit, causes the tumblers to assume the positions indicated in Figs. 14 and 16, bringing the wiper-arms 6 into upright position, closing the wipers 5 together above the label which is supported on the pickers 4. At this position the pivot centers of the tumblers 41 and their connecting links 40 are in dead-center alinement, so that the wiper arms are rigidly locked to resist any outward pressure occasioned by the forcing of the wipers against the bottle, and in this locked relation the parts descend by the movement of the slide. When approaching its lower limit the rolls 46 engage the cam 50 and the tumblers are thereby swung downward to the position indicated by the line $m$ on Fig. 14, or until the lug 48 strikes a stop 51 on the carrier frame. This action draws back the connections and rocks the sleeves on their axes, swinging the wiper-arms outward at an angle, as indicated by the dotted lines $m^6$, Fig. 14, at which position the parts are retained by the friction of the tumblers while the slide again moves to its elevated position.

The wiper devices are shown in spread position in Figs. 1 and 2, which represent the mechanism with its parts at positions where stopped by the throwing off of the automatic-stop clutch.

For depositing paste upon the pickers, I provide a pair of rollers mounted to have reciprocative movement and to travel in paths at the right and left of the position where the label is presented and affixed; and into which paths the pickers are brought by a lateral movement immediately after releasing the label. A rocker or oscillating frame comprising two upwardly projecting arms 52, is hingedly supported by axis pivots 53 in a bearing-yoke fixed to the frame A, and is provided with an arm 54 carrying a stud or roll that engages in the groove of the cam 23 on the operating shaft 1, whereby oscillative movement is imparted to said arms. Projecting forward at the top end of each oscillative arm, which is rearwardly offset as shown, there is arranged a hanger or roll-supporter 56 hingedly mounted at one end upon a transverse pin or axis 57 fixed in the arm, and having at its other end an axis, journal or pin 58, upon which is mounted the paste-transferring roller 55 and a cam-bearing roller 59. The preferred structure and arrangement of these devices are best shown in Figs. 2, 3, 13, 17 and 18. Arranged upon the oscillator arm there is an endwise movable rod 60, the top end of which abuts against an overhanging finger 61 formed on the roll-supporter 56, while its lower end runs against the shaped surface of a projecting cam-piece 62 attached to the supporting frame. A suitable spring 91 is linked to the finger 61 of the hanger and to a stud fixed in the oscillator arm, which spring tends to draw the roll-hanger and transferring-roller downward.

The roll-supporters and rollers are arranged in right and left order on the respective oscillator arms, the transfer rollers in alinement with the paste delivery-rolls 25, and the cam rollers 59 in alinement with the tops or cam surfaces 37 on the wiper-arms 6, when the latter are at closed position. The movement of the oscillator 52 brings the transferring rolls back against the surfaces of the paste-delivering rolls (see Fig. 10) while the latter are being rotated, thereby rolling their surfaces together and charging with paste, and then advances said transferring rolls forward, out of contact with the pickers, to the position shown in Fig. 3, then causes them to move rearward passing across the faces of the pickers to deposit thereon a suitable film of paste or adhesive substance. The cam surfaces on the wiper-arms uphold the rolls 55 until their proper time for contact with the pickers; and the rods 60 prevent the roll-hangers from dropping too far downward when the transferring rollers are out of contact with the delivery-rolls, wiper-cams or pickers.

The label-holder 3 consists of a plate or frame removably supported upon projections or ears 63 at the upper part of the carrier C, which projections are furnished with lugs or pins 64 that retain the holder-plate in proper position and permit of its being readily removed and replaced when desired. The holder-plate is preferably made with open front, and a series of standing guides or pins 65 are provided for steadying and supporting the pile of labels in proper order for delivery therefrom. The pins 65 are each provided with a lateral supporting arm 66 attached thereto, the opposite end of which is secured to the plate in a firm but adjustable manner, as by a pivot-stud 67 riveted or screwed into the plate. (See Fig. 6.) The several guide-pins, or a suitable number of them, are formed each with an inwardly projecting toe or point $t$ at the lower end, (see Figs. 7 and 22) and the pile of labels is supported on said points which extend under the edges thereof.

The ends of the guide-pins preferably extend below the level of their attaching arms 66, as illustrated. The faces of the pickers 4 are provided with counter-matching cavities or recesses 68, into which the toed ends of the pins are received when the label-holder is moved into conjunction therewith in the operation of the machine. The relative position at which the label-holder meets the pickers when presenting a label thereto, is indicated on plan by dotted lines on Fig. 5, and in elevation in Fig. 10.

As a feature of the construction and combination herein described, the label-holder gives a bottom delivery for the labels, and places or presents the label upon the pasting pickers approximately at the position where it is applied to the bottle surface; or directly over the bottle-rest; so that there is no lateral transfer or movement of the single label L¹ after it leaves the holder to bring it into position for affixment; hence there is no liability of dropping, throwing off, or the displacement of labels as they are presented for the wiping-on operations. The label-holder is open and chargeable at the top; the labels being introduced thereinto from above by simply lifting off the follower and dropping a charge of labels upon the pack. It has a clear feed-way through to the bottom of the guide-stakes where the labels are delivered to the pasting pickers; thus affording a continual feed, since the pack of labels can be added to or replenished by top-charging without interfering with the working adjustment of the bottom-delivery devices.

The label-holder-plate may be of any desired shape, but is preferably made with an open front, or unobstructed space G at its front side, with the plate material forming but three sides of the square; and for supporting the front guide pins 65ª, the attaching-arms therefor can be constructed with a forward and inward curvature, or angular hooked-shape, as at 66ª, Fig. 5, so that said pins are supported upon the sides of the holder-plate. This open construction affords the attendant a clear view of the pile of labels and of their bottom delivery to the pickers.

As a means for keeping the labels in a firm pile upon the label-holder there is employed a follower device adapted for automatic free movement in one direction and for self-locking to positively resist movement in the opposite direction, so that a constant pressure is maintained upon the decreasing pile of labels and the pile held secure against lifting when brought into contact with the pasting pickers. This follower is preferably constructed as a simple finger 69 (see Figs. 4 and 8) arranged upon an upright standard 70 fixed in the top of the carrier slide C, or label-holder support. Said standard is formed rectangular, or of other suitable cross-section; and the opening 71 in the head of the follower-finger is formed to approximately fit the standard at the sides, and at the front upper part of the opening, or offset, while it is larger below at the front edge, so that while the fingers can freely slide down the standard, it will immediately lock or cramp upon the standard and resist upward movement or pressure exerted at the outer end of the finger which rests centrally upon a plate 72 laid upon the top of the pile of labels. By this means the labels are held flat and firmly sustained to meet the pressure of the pickers when the label-holder with the pile of labels descends thereon. The finger automatically follows down the standard as the labels are fed off the bottom of the pile. By taking hold of the knob 73 at the head of the finger said finger can be readily lifted from the pile and swung to one side on the upper reduced part of the standard when it is desired to renew the supply of labels upon the holder, or to remove the label-holder from its support for any purpose. The follower plate 72 being held at only one point by the finger, allows the labels to readily adjust themselves to the plane of the pickers, thus affording a perfect contact and uniform application of paste.

The operating shaft 1 extends through and rotates in a suitable bearing a on the frame, and is provided with a loose running pulley 74 and an automatic-stop clutch mechanism 75 for connecting said pulley and shaft for operation. The clutch controlling lever 76 is connected by a rod 77 with a treadle 78 fulcrumed in suitable manner upon the base of the frame, so that depression of the treadle will release the clutch and put the machine into action. When the shaft has made one revolution, if the treadle is released, the controller 76 engages the lug of the clutch bolt and automatically throws the clutch out of engagement. If the treadle is held down the machine continues in operation. A spring 79 moves the clutch controller in opposition to the treadle.

The rest 12 for supporting the bottle B is preferably constructed, in detail, as shown in Figs. 10, 11 and 12. The top portion is formed as a cradle member for receiving and containing the bottle, and has a downwardly extended slotted arm 11 integrally formed thereon, by which it is secured and adjusted on the front of the frame by screw-bolts passing through the slot and threaded in the frame. Beneath the cradle member, and hinged to or fulcrumed on the rear end thereof at 83, is a binder-bar 80, the fore end of which engages with an adjusting screw 81 threaded in the main member in unstable manner for regulating the pressure of the binder. The adjacent surfaces of the binder and top portion are longitudinally grooved, and within the intervening space there is held the end-gage 82, which consists of a plain bar bent at an angle, and having its end projecting upward through a slot formed in the cradle member, as shown. When the adjusting screw is turned in the binder-bar securely clamps the end-gage at any adjusted position. The bottle-rest is stationary in the operation of the machine, but may be adjusted up or down to accommodate different sizes of bottles, and the end-gage can be adjusted in or out thereon to regulate the position of the label in relation to the end of the bottle.

In any instance desired the wiper mechanism can be provided with movable wiper-follower for pressing the flexible wiper-pads forward with a peculiar yielding force. An arrangement for such wiper-followers is illustrated in Fig. 14, and comprises for each wiper the following named devices: An arm or lever F of convenient shape is pivotally supported on the wiper-arm 6 whereon a suitable ear is formed for receiving the joint pivot $F^6$, which is axially parallel with wiper-arm axis 7. The upper part of the lever F projects inward over the wiper 5, and is provided at its extremity with a rounded finger or roll $F^5$ that rests against and extends along the back of the wiper-pad 5 in parallel relation to the axis and wiper surface; the length of said fingers being approximately the same as the width of the working face of the wiper, more or less. A suitable tension spring is combined with the arms for pressing the follower to its forward or normal position. Said spring preferably consists of a contractile coil S strained between a stud $f$ fixed on a projecting part of the lever F and a stud $f^2$ fixed upon the wiper supporting arm 6. The levers F move in close relation with the wiper arms 6 as the latter swing outward and inward for opening and closing the wipers; but when wiping the label upon the bottle the wiper-pad is flexed around the finger $F^5$, and the followers are forced outward laterally, in opposition to the spring pressure, to a degree sufficient to pass the sides of the bottle; the action of the follower being to keep the flexure of the wiper as near its free edge as possible, and to press the wipers toward the bottle surface with a yielding pressure. The upper part of the lever at $f^4$ is best formed as a stop-lug to strike against the side of the wiper-arm for limiting the inward swing of the follower toward the inner edge of the wiper. The inner edges of the wipers may, when the follower is employed, or if so desired, be made so as to come near together without contact, as indicated by dotted lines Fig. 14, since the followers will brace and sustain the advanced edges of the wipers for clamping the label to the bottle preparatory to wiping it on.

For adapting the bottom-delivery label-holder of my invention for the accommodation of different sizes and shapes of labels within a large limit of variation, I provide a construction of the nature illustrated in Figs. 21 22 and 23, the former being for rectangular labels and the latter for oval or elliptical shaped labels. As shown in Figs. 21 and 22 the front label-supporting guides 65, 1 are firmly attached to the holder frame or plate 3, which is formed with an open space G at the front. Said frame is provided with bearings $b$ $b$ in which there is mounted a rotatable shaft 93 having right and left screw threads formed thereon. The side guide members 65, 2 are attached to arms 96 having internally threaded bosses $n$ that fit respectively upon the threaded portions of the shaft 93. A second threaded shaft 94 is mounted in bearings $d$ at one side of the holder-frame, and the rear guide pins 65, 3 are attached to an arm 97 that has a threaded hub $e$ fitting upon said screw. Each of the guide carrying arms 96 and 97 is provided with a pin or guiding support 98 fitted to slide in a bearing $i$ parallel with the screw-shaft, and by means of which the arms and guide-devices are supported in proper relation. The screw-shafts are respectively provided with thumb-heads 95 and 99, or means whereby said shafts can be rotated for moving the arms along their screw threads and thereby adjusting the label-holding guides or supporters outward or inward to increase or diminish the size of the label-containing space as desired. The hubs $h$ about the openings which receive the holder-carrying pins 64, are made of sufficient height to afford a steady support for the holder-plate or frame upon the arms 63 of the carrier C. The label-holding guide-pins in this illustration are made of flat form instead of cylindrical, and their toe projections $t$, upon which the labels rest, are formed with a downwardly rounded top surface $r$ and a long incline $o$ at one side to facilitate the delivery of the single labels from the bottom of the pile without causing those above to escape.

In the holder for oval labels (Fig. 23) the guide pins 65, 4 are arranged in opposite pairs upon arms 96 that are adjusted by the right and left screw-threaded shaft 93, the form of label being such that no front and rear adjustment is required for the different sizes of labels, the side adjustment affording quite an extended limit. The position of the labels is indicated on Figs. 21 and 22 by the dotted line L.

The label-follower finger is, when so desired, made to give an elastic pressure upon the pile of labels or follower-plate resting thereon. For this purpose the finger is provided with a spring $69^a$ secured upon the finger 69, (see Fig. 4) and adjusted so as to permit a slight yield of the spring before the finger gives a rigid resistance, as the bottom of the pile of labels is, by downward movement of the label-holder, pressed upon the pickers. This slight elasticity avoids the liability of the underlying labels becoming so firmly compressed upon the projection $t$ at the bottom delivery, as to cause tearing of the bottom label when drawn therefrom by the paste-applying pickers.

In the operation, the paste reservoir is charged with semi-liquid paste, mucilage, glue or suitable adhesive substance, and the label-holder is loaded with a pile of labels, disposed face upward, and the follower-plate and follower-finger placed upon the top of said labels. The machine is then given a motion to deliver a first label to the pickers, and is then ready for the labeling operation to proceed. Assuming the various operating parts to be at the positions shown in Fig. 1, and with a label held by the paste-applying pickers suspended above the bottle-supporting rest, as indicated. The attendant places the bottle or article to be labeled upon the rest 12, and depresses the treadle 78 which releases the clutch-dog which in turn engages with a recess or shoulder on the hub of the revolving drive pulley 74 locking the shaft 1 thereto and thereby putting the mechanism in motion. In the resultant action the carrier slide C first has a slight upward movement and then moves downward. This upward movement is sufficient to bring the tumbler-roll 47 against the upper cam 49, thereby actuating the tumblers 41—42 and their connections for throwing the wiper-arms 6 from the position shown in Figs. 1 and 2 into upright position, as shown in Figs. 3, 4 and 14, at which position said arms are braced by the dead-center alinement of the tumbler-joint pivots. This primary movement of the wiper-arms brings the wipers 5 together in their angular position adjacently above the label L¹ onto which they then descend as the carrier slide starts downward, thereby clamping the label along its central part against the surface of the bottle. At the same time the rocker or oscillating arms 52, actuated by cam 23, commence to move forward, advancing the paste-transferring rollers 55, and their cam-rolls 59 riding on the cam surfaces 37 at the top of the wiper-arms keeps the paste-transferring rollers out of contact with the pickers as they pass forward. The forward movement of the oscillating arms swings the cam or lug 17 from beneath the pivot support 16, permitting a depressive movement of the pivots 15, picker-arms 14 and pickers 4 for a short distance, simultaneously with the early part of the downward movement of the wipers. The picker-arms are then immediately swung outward laterally by the action of the cam 22, lever 20 and connections 19, carrying the pickers out of the way of the descending wipers and to a position in range with the path of the paste transferring rollers 55 which have then reached a forward position, as indicated on Fig. 3. Said rollers 55 are held properly suspended by the rods 60 after the wiper-arms and their cams 37 have moved downward beyond the level at which said rollers are desired to work. The oscillating arms are then swung rearward, passing the rollers 55 across the faces of the respective pickers 4 for transferring thereto a suitable film of paste or adhesive material; and bringing said transfer-rollers back into contact with the faces of the paste-delivering rolls. The continued downward movement of the carrier slide C, upon which the wipers and label holder are mounted, causes the wipers to wipe the ends of the label around the respective sides of the bottle which lies at the position indicated upon the stationary rest. (See Fig. 3.) As the operation progresses the pickers 4, after receiving their film of paste, swing back to their original position: and as the carrier slide reaches its limit of downward movement the label-holder comes into conjunction with the pickers, pressing the bottom of the pile of labels thereon against the pasted surface of said pickers; a single label adheres thereto and is delivered or picked from the bottom of the pile when the label-holder is caused to ascend by the upward movement of the carrier-slide. When the carrier-slide is near the downward limit the tumbler rolls 46 engage the cam 50, and the parts thereby brought into action swing the wiper-arms outward so that the wipers 5 which descended between the picker-arms, are caused to pass on their return or upward movement, outside the picker-arms. The upward movement of the carrier-slide brings the parts to their first position. The rack 30 and ratchet-gear, during such upward movement, cause the rotation of the paste-delivering rolls 25 in contact with the transferring rollers 55, thereby charging the surfaces of said transferring rollers with a uniform coating of paste for their next action. As the shaft completes its revolution the clutch controller (if not held retracted) engages the lug of the clutch-dog and retracts it from the pulley, thereby throwing off the clutch and stopping the mechanism until the treadle is again depressed.

What I claim as of my invention and desire to secure by Letters Patent, is—

1. In a labeling machine, the combination, with a bottle supporter, and devices for suspending a label preparatory to its affixment to the bottle; a label-supply-holder adapted for delivering a label to said suspending devices, a pair of movable wipers that pass the labels from said suspending devices onto the bottle surface, and means for reciprocating the label-supply-holder and wipers to bring said label-supply-holder and wipers alternately to the position of said suspending devices, for the purposes set forth.

2. In a labeling machine, in combination, with a bottle centering supporter, a pair of paste-applying pickers, and means for charging said pickers with paste; of a bottom-delivery label-holder, a pair of wipers, and a vertically reciprocating carrier having said label-holder mounted thereon and adapted to be brought into conjunction with the pickers by the reciprocative action of said carrier.

3. In a labeling machine, the combination of a stationary bottle rest, a pair of laterally movable pasting-pickers, means for operating said pickers, a vertically movable carrier, a bottom-delivery label-holder supported on said carrier above the pickers, laterally movable wipers supported by said carrier, means for spreading and closing said wipers, and means for reciprocating said carriers for carrying the wipers past the bottle-rest, and bringing the label-holder to and from the pickers.

4. In a labeling machine, the combination, of a stationary bottle-supporting device, a pair of paste-applying label-picker devices for adhesively engaging the respective ends of a label, a pair of downwardly-acting laterally-separable wipers, and an overhead label-supply-holder that delivers labels to said paste-applying label-picker devices in a direct line with said bottle-supporting device; the parts being arranged for operating in common axial alinement with each other perpendicular to the planes of the picker-devices and bottle-supporting device, substantially as set forth.

5. In a labeling machine, the combination, of a stationary bottle-supporting device, a pair of retractable paste-applying pickers, a pair of downwardly acting movable wipers, and a label-holder disposed for operation in vertical alinement with each other: an up-and-downwardly movable carrier slide having said label-holder and wipers connected therewith, a reciprocating means for supplying paste to said pickers, and means for imparting movement to the carrier and the pasting-applying mechanisms.

6. In a labeling machine, the combination, of an open-bottomed label-holder, pickers adapted for singly disposing the labels, wiping-on devices, and means for bringing the label-holder into conjunction with the pickers for delivering a label from the open-bottom onto said pickers by a movement perpendicular to the plane of the picker faces.

7. In a labeling machine, the combination, of a pair of laterally movable paste-applying pickers adapted for suspending a label preparatory to wiping on, a pair of movable wipers adapted to pass between said pickers when affixing said label to a bottle, and means for spreading apart said pickers laterally to enable said wipers to pass between them without contact therewith.

8. The combination, of the pasting pickers, laterally swinging picker-arms, upright movable pivot-axles for said arms, suitable bearings for said axles, an elevatable foot or supporter for said pivot-axles, means for elevating and depressing said foot or supporter, an actuating lever and connections for swinging said picker arms laterally, and means in connection with the operating shaft, for working said lever.

9. In a labeling machine, an underlying bottle-supporting rest, a pair of transversely retractable pasting-pickers that engage the respective ends of the labels, means for retracting said pickers, an overlying label-holder, and laterally retractable wiper-devices reciprocatively operating in connection therewith, said wipers adapted for primarily closing over the pickers, their inner edges meeting and clamping the label, along its central part to the face of the bottle, preparatory to the retraction of the pickers and downward movement of the wiper-carrier.

10. In a labeling machine, a pair of wipers disposed in oppositely inclined relation, with their ends touching and bracing each other, as a means for preparatively clamping the label to the bottle.

11. In a labeling machine, in combination with a bottle supporter, and pasting pickers adapted for disposing a label; a pair of wiper-supporting arms, flexible flat resilient wipers, respectively mounted upon and rigidly attached at one edge to said arms, said wipers disposed in angular relation to each other, with their inner or free edges in advance of their attached edges; whereby said free edges primarily engage the label before their wiping-on surfaces.

12. In a labeling machine, the combination with a bottle-supporting rest; of movable wipers, a reciprocating wiper-carrying mechanism, and means whereby said wipers are moved inward to act closed together when passing the bottle rest in one direction, and means whereby said wipers are opened or separated, and kept clear from contact therewith when passing said rest in the opposite direction.

13. In a labeling machine, in combination, a stationary bottle-supporter, an upwardly and downwardly movable bottom-delivery label-holder, means for sustaining a pile of labels thereon, paste-applying pickers adapted for receiving and disposing a label directly over said bottle-supporter, said pickers movable to and from that position, a pair of vertically and laterally movable wipers, means for bringing said wipers together above the pickers, moving them downward past the bottle-supporter in closed relation, and means for laterally separating said wipers when below said supporter and moving them upward in open relation.

14. In a labeling machine, the combination, with a bottle-supporting rest, and means for pasting and presenting the labels, of a vertically reciprocating carrier having horizontally projecting axles fixed therein, wiper-arms provided with bearing-sleeves respectively mounted on said axles, wipers attached to said arms, tumbler members pivotally supported on said carrier, and provided with upper and lower cam-engaging studs or rolls, connecting-links uniting said tumbler members and wiper-arm-sleeves, an upper cam-device and a lower cam-device mounted on the frame for actuating said tumblers as the carrier approaches the upper and lower limits of its movement, substantially as set forth.

15. In a labeling machine, the combination of the frame provided with an upright guide-rod, the reciprocating carrier sliding thereon, the wipers mounted upon laterally swinging wiper-arms attached to bearing-sleeves, the wiper-arm axles fixed on said carrier and extending through said bearing-sleeves, a bearing head or roll on the front end of each axle, and upright parallel guides attached to the frame and adapted for supporting the front ends of the wiper-axles against lateral pressure.

16. In combination, with the reciprocating carrier, wiper-arms mounted on axles fixed in said carrier, and the tumbler-actuating cams; of tumbler devices comprising front and rear tumbler members connectedly pivoted to and embracing the carrier-frame, means for creating friction on said tumbler members, means for engagement of the tumblers with their actuating cams, and pivot-jointed links connecting the several tumblers to a crank-lug on the respective wiper-arm bearing-sleeves, the joint pivots being disposed in such relation that they will stand in dead-center alinement when the wiper-arms are at upright or working position, for the purposes set forth.

17. In a labeling machine, the paste-box or reservoir comprising two interior bays, and an intervening exterior space, rotatable delivering rolls disposed within said bays, a shaft uniting said rolls across the intervening space, and a gear and ratchet mechanism mounted on said shaft; in combination with a reciprocating rack meshing with said gear; and paste-transferring means acting against said delivering rolls.

18. In a labeling machine, the combination of a paste-box, a paste-delivering roll having a shaft or axle, a reciprocating actuator, a gear mounted on said roll-axle and engaging with said actuator, and a friction-ratchet or engagement device connecting said gear and axle for rotation of the roll in one direction, and releasing it when the actuator moves in the opposite direction.

19. In a labeling machine, in combination, with the frame and the reciprocating carrier or slide provided with a toothed rack, a removable paste-box, paste-delivering rolls mounted in said paste-box, and provided with a supporting axle, a gear mounted on said axle and adapted for meshing with the carrier rack, an interlocking means for detachably connecting said paste-box to the frame to bring said rack and gear into mesh, and for permitting instant removal of the paste-box and rolls therefrom, substantially as set forth.

20. The combination of the paste-box, a pair of paste-delivering rolls therein, a pair of paste-transferring rollers movable forward and backward at either side of the label-affixing space, a pair of pasting pickers adapted for receiving and presenting a label in central alinement with said affixing space, and means for moving said pickers laterally into the paths of said transferring rollers for receiving paste therefrom.

21. In a labeling machine, the combination with the pickers, the paste-box and paste-delivering rolls; of paste transferring rollers movable from said delivering-rolls to the front of the picker devices out of line with the picker faces, and passing in contact with the picker-faces on their return movement.

22. In a labeling machine, the combination, with the pickers, the wipers, wiper-arms having top cam surfaces, and paste delivering rolls, of the paste-transferring rollers, swinging hangers supporting the roller axles, a rocking frame with arms to which said hangers are hingedly connected, cam-bearing rolls upon the roller axes that travel on said top-cam surfaces, an endwise movable rod arranged on the rocker beneath each hanger, a cam surface supporting the foot end of said rod, and a spring for downward pressure on said roller hanger, for the purpose set forth.

23. In a labeling machine, the combination, with a paste-delivering roll, a device for applying paste to a label, a paste-transferring roller, a reciprocating carrier for moving said transferring roller from the delivery-roll to the applying device, and vice versa, a swinging hanger pivotally attached to said carrier and having the transferring roller axis fixed thereon, and a detached supporter that prevents said hanger and roller from dropping beyond a determined limit, but non-interfering with the opposite movement of the hanger.

24. In a labeling-machine, the combination, with the pickers, laterally swinging picker-arms and means for imparting lateral movement thereto; of upright pivot-axles for said arms, suitable bearings therefor, a lifting supporter for said pivot-axles, pivot-depressing springs, rollers for transferring paste to said pickers, a rocker frame carrying said rollers, means carried upon said rocker-frame for actuating said lifting supporter, and a cam on the operating shaft for oscillating said rocker frame.

25. In a labeling machine, in combination with means for applying a label to a bottle or article; of a bottom-delivering label-holder and pasting pickers, said label-holder adapted to deliver the label upon said pickers approximately at the point where it is applied to the bottle surface.

26. In a labeling machine, in combination, a bottle-supporting rest, a pair of laterally movable pasting pickers disposed for supporting the label in alinement with said rest, and a reciprocating label-holder adapted for delivering labels singly to said pickers directly in alinement with and over the position where said labels are affixed to the bottle.

27. In a labeling machine, an open-bottomed label-holder, label-pickers adapted for pasting and picking labels from the bottom of said holder, means for supporting a bottle directly beneath said label-holder and pickers, and a reciprocating paste-transferring means traversing over the faces of the pickers approximately parallel with and below the plane of the label-holder for charging a film of paste upon said pickers.

28. In a labeling machine, in combination with pasting pickers, a bottom-delivery label-holder comprising a plate having an open center, a series of guide-pins severally supported upon said plate and provided with inwardly projecting toe-points for supporting the labels, and means for preventing the lifting of the pile of labels upon the label holder.

29. In a labeling machine, in combination with pasting and wiping-on mechanism, a bottom-delivery label-holder comprising a plate or frame having an open center, a series of upright guide-pins each provided with a lateral supporting arm fixed thereon at a position above its end, and an inwardly projecting toe for supporting the labels at the lower end of said guide pin, and means for securing the opposite end of the guide-pin-arm to the holder-plate, that permits horizontal pivotal adjustment.

30. In a labeling machine, a label-holder comprising a plate or form having an open center, and open at the front side, and a series of standing guide-pins each provided with an inward toe or point upon which the labels are supported for bottom-delivery, the guide-pins for the open front of the holder being provided with forwardly and inwardly directed overhanging supporters; whereby said front guide-pins are supported upon the sides of the holder-plate.

31. In a labeling machine, the combination with an overhead label-holder comprising guide-pins that extend below their support and are provided at their foot with inwardly projecting toe-points upon which a pack of labels is upheld; of pasting pickers having paste-receiving surfaces that extend beyond the end lines of the labels, said pickers having within the edge limits of said paste-receiving surface recessed notches corresponding to the ends of said guide-pins and for receiving the same without contact when the label holder and pasting pickers are brought together.

32. In a labeling machine, a label-holder having means for detachable connection with its supporting carrier and comprising a set of guide-stakes for directing the sides and ends of the labels, said stakes provided with means for the support of a pile of labels thereon, and forming a label compartment having an open top for receiving the charge of labels and an open bottom for the delivery of labels from said pile, a carrier for supporting the label-holder, and a resisting follower for maintaining the labels in compact pile and against lifting action; said follower having its support upon the carrier independent of the detachably supported label-holder, the follower being retractable to permit charging the labels into the holder.

33. The combination, of a label-holder comprising a label-holder-frame and a set of pins or guide-stakes with lower-end projections for sustaining a pile of labels thereon for bottom delivery, means for regulating the position of said stakes to accommodate larger or smaller labels, a supporting carrier to which said label-holder frame is removably attached, a pair of paste-applying devices that contact by direct pressure with the bottom of the pile at its respective ends, for pasting and taking a label therefrom, and a follower means having its support upon said carrier independent of the holder-frame attachment, and provided with a movable resistance member that rests upon the top of the pile and is self-movable in downward direction, but automatically lockable to afford resistance in opposition to the upward pressure of the paste-applying devices.

34. In a labeling machine, the combination, with a bottom-delivery label-holder, and a label-holder support provided with an upright standard; of a follower-finger slidable on said standard and adapted to resist upward pressure at its outer end by cramping upon said standard, substantially as set forth.

35. In a labeling machine, in combination with the pasting-pickers and the bottom-delivery label-holder: of a removable label-follower-plate and a resistant follower-device comprising an overlying member unattachedly supporting said plate at only one point, and permitting self-adjustment of the follower-plate and labels to the plane of the pickers.

36. In a labeling machine, an open-bottomed label-holder comprising means for guiding the edges of a pile of labels, and inward projections at the foot thereof that support the labels; in combination with pasting picker-devices adapted to take or receive a label therefrom, and a follower for retaining the pile of labels in opposition to the contact of said picker-devices: said follower provided with means for affording a slight yielding or elastic action succeeded by rigid resistance to the pressure of said pasting picker-devices, when taking a label from the label-holder.

37. In a labeling machine, a bottom-delivery label-supply-holder, comprising a series of guides having projections at their lower ends for sustaining a pile of labels, a follower-plate seating upon the pile of labels, a follower-finger supported at its head by an upwardly cramping slide-joint upon an upright stand-bar, the tip end of said finger overhanging said plate, and a spring carried upon said follower-finger and interposed between the tip-end of said fingers and said plate with a limited space for its resilient action.

38. In a labeling machine, in combination with the wipers, and supporting arms carrying said wipers; the wiper-followers each consisting of an arm or lever fulcrumed upon the wiper-supporting arm and projecting over the wiper with a finger that rests thereon, and a spring acting to force said wiper-follower toward its normal position with a yielding pressure, substantially as set forth.

39. In a labeling machine, the combination, of a flexible wiper, a swinging arm that supports the wiper, a yieldable wiper-follower carried upon said swinging wiper-supporting arm, and means also carried thereon for pressing the wiper-follower against the back of the wiper, for the purpose set forth.

40. In a labeling machine, in combination with means for supporting a bottle, a reciprocating carrier having a pair of oppositely swinging wiper-arms pivotally supported on said carrier, inwardly inclined wipers attached to said arms, follower levers pivoted to said wiper-arms and overhanging the wipers, springs controlling said follower levers, limiting stops for their inward movement, means for spreading and closing said wiper-arms, and means for moving the carrier past the bottle supporter.

41. In a labeling machine, in combination, with a bottle supporter, and means for pasting and presenting the labels, of a pair of flexible wipers, opposite outwardly swinging wiper-arms having said wipers fixed thereon, supplemental arms fulcrumed on said wiper-arms and carrying follower fingers that act against the backs of the wipers, and a spring, or springs, that act on said supplemental arms to press forward the followers for a yielding action against the wipers during the wiping operation.

42. In a labeling machine, in combination with a label-supply holder, and wipers, a pair of paste-applying pickers, picker-carrying arms therefor adapted to have lateral swinging movement in the direction of the plane of the pickers, the axis-support for said arms adapted to have movement perpendicular to said plane, and means for imparting lateral movement to said picker-arms, and vertical movement to said axis-supports.

43. In a labeling machine, a bottom-delivery label-supply holder, comprising a plate or frame having a screw-shaft journaled on said frame, laterally movable bars threaded on said screw-shaft, and upright guides for retaining labels, fixed to said bars and projecting below the same, and provided with laterally offset points for supporting the labels, said points fitted for the release of the lower labels from the holder by adhesion.

44. In a labeling machine, a bottom-delivery label-supply holder, composing, in combination, a removable holder-plate or body provided with interlocking means for detachably sustaining the same upon the machine, a series of upright guide-standards having downwardly projecting ends with inwardly offset terminals for holding the pile of labels, movable supporting members for carrying said standards adjustably mounted in connection with the holder-plate, means for directing and screws for effecting the lateral adjustment of said supporting members and guide-standards in connection with the holder-plate, for the purpose set forth.

45. In a labeling machine, a label-holder comprising an open-front holder-plate or frame provided with attaching hubs with openings, bearings on said frame, a screw-shaft journaled in said bearings, guide-pins having toe projections for supporting the labels, carrying-arms attached to said guides and threaded upon said screw-shaft, and means for rotating said screw-shaft.

46. In a labeling machine, in combination with pasting devices adapted to take or receive a label therefrom; of a bottom-delivery label-supply holder having means for guiding the edges of the labels, and inward projections that support the labels, guide-carrying devices, a screw shaft journaled in bearings on the holder and threaded through said guide-carriers for regulating the position of said guides, and a reciprocating means for bringing said holder and pasting devices together.

47. In a labeling machine, the combination, with means for pasting and presenting the label, and means for wiping the label upon a bottle; of a bottle-centering and supporting rest having an end-gage comprising an angle member adjustably mounted upon said rest to project upward from the bottle seat, and means for securing said end-gage at positions of adjustment.

48. In a labeling machine, the combination, of a bottle support, an end-gage adjustable thereon, means for adjusting the height of said bottle support, movable pickers for suspending a label above the bottle-support, means for charging said pickers with paste, a label-holder movable to deliver labels to the pickers, a pair of vertically movable laterally swinging wiper-arms, opposite inclined wipers carried by said arms to swing over the pickers and for transferring the label from said pickers to a bottle upon said bottle-support, spring-pressed wiper-followers carried upon the wiper-arms and acting against said wipers, and means for imparting downward, lateral and upward movements to said wiper mechanism.

49. In a labeling machine, in combination with means for presenting a label, and means for wiping the label upon the bottle; a bottle-rest or supporter comprising a cradle member, means for attaching it in position upon the machine, a binder-bar fulcrumed on said cradle member, an adjusting-screw for regulating said binder-bar, and an end-gage adjustable between said cradle member and binder-bar, and having an end that projects upward within the cradle, substantially as set forth.

50. In a labeling machine, the combination of a vertically reciprocating carrier, means for moving the same, a bottom-delivery label-holder supported on the carrier, a supporting-rest below said label-holder, a pair of pasting-pickers for receiving and disposing a label above said rest, means for effecting opposite lateral movement of said pickers, a pair of wipers attached to laterally-movable arms supported on said carrier, means for bringing said wipers together above the pickers preparatory to the downward action of said carrier and for separating said wipers preparatory to the upward action of the carrier, a paste-box and paste-delivering rolls, means for rotating said rolls, paste-transferring rollers, means for reciprocating said rollers from the paste-box to the pickers, and means for directing said rollers out of contact with the pickers while passing in one direction, and permitting contact while passing in the opposite direction.

51. In a labeling machine, the combination, of the standard frame having a shaft-bearing and an upright guide-rod, the operating shaft journaled in said bearing and having the drive-wheel mounted thereon, the reciprocating wiper-and-label-holder-carrier movable on said guide-rod, a crank on said shaft connected with said carrier, an oscillating frame having paste-transferring means mounted thereon, the laterally movable pickers, means for supporting and moving said pickers, and a controlling lever therefor, cams on the operating-shaft for actuating said oscillating frame and picker-controlling lever, an automatic-stop clutch for the drive-wheel and shaft, a spring-pressed clutch-controller and the treadle and connection for working said clutch-controller, substantially as set forth.

52. In a labeling machine, the combination with a stationary bottle rest, and means for wiping a pasted label onto a bottle laid on said rest; of an overhead bottom-delivery label-holder disposed above and in line with said rest, paste-applying devices that take and hold the labels for attachment, and actuating means for bringing the label-holder and paste-applying devices directly together.

53. In a labeling machine, in combination, a stationary bottle rest, an open-topped, open-bottom label-holder, means for simultaneously pasting and taking labels therefrom by a direct bottom delivery, and reciprocating wipers for wiping on the pasted labels.

54. In a bottle-labeling machine, in combination with means for applying a pasted label to a bottle, a through-feed, bottom-delivery label-holder open at its top for insertion of a pack of labels, means for vertically moving said label-holder, and paste-applying pickers adapted to separate, by paste adhesion, a single label from the under side of a pack of labels supported upon said label-holder.

55. In a bottle-labeling machine, in combination with means for wiping a label onto a bottle, a continual-feed, top-chargeable label-holder, having means for supporting a pack of labels, overhanging the said wipers, and adapted to have labels adhesively extracted singly from the open-bottom of said label-holder, a pair of horizontally projecting picker-plates normally in alinement with and beneath said label-holder, means comprising swinging rollers for charging the picker faces with adhesive substance, reciprocating means that brings the bottom of the pack and picker-faces into contact, and vice versa, by movements approximately perpendicular to the plane of the labels, means for actuating the pickers, and means for actuating the paste-charging rollers to take them into and out of contact with said picker faces as they approach the label-holder.

56. In a bottle-labeling machine, the combination, of a top-charged, bottom-delivery label-holder, a carrier or support therefor having engaging devices whereon said label-holder is sustained in an overhanging position, a stationary bottle-rest upon which the bottle is primarily laid beneath said label-holder, vertically moving horizontal-faced paste-applying pickers that act in conjunction with the bottom of said label-holder for adhesively taking labels, one at a time, therefrom, and vertically and laterally moving wipers for wiping the label down upon a bottle.

57. In a labeling machine, the combination, of an open-bottomed label-holder comprising a set of side guides, a set of right and left end guides, means for simultaneously shifting the said end guides in opposite directions for adjusting the label-holder to receive different sized labels, paste-applying pickers disposed beneath and co-acting with said label-holder guides for removing one label at a time from the bottom of the pile of labels in the label-holder, and wipers for affixing said label to a bottle.

58. In a bottom-delivery label-holder having means for supporting a pile of labels therein; a follower having a yielding member, a follower-supporting guide outside the area of the pile, said follower freely movable in one direction but affording resistance against lifting action on the labels.

59. In a labeling machine, the combination, of an open-topped, bottom delivery label-holder, comprising guides for the sides of a pack of labels and guides for the ends of said pack of labels, said guides arranged to afford a continued through-feed passage for the labels, means disposed outside the line of said passage for adjusting said label-holder-guides to accommodate different sizes of labels, without changing the relative position of the central plane of the pack in respect to the attaching mechanisms, paste-applying pickers that coact with the bottom end of said guides for releasing and downwardly removing the single labels from said pack, and downwardly acting wipers for affixing said label to a bottle, or like article, underneath said label-holder.

60. In a bottle-labeling machine, in combination, an underlying stationary supporting rest upon which the bottle is primarily placed, pasting pickers adapted for taking and supporting a label at position above the bottle preparatory to its affixment thereto; an over-head, top-chargeable, continual-feed label-holder arranged for upward and downward movement and for delivering to said pickers single labels from the bottom of a pack of labels held therein, a pair of movable wipers that take the label from the pickers and have a downward movement for wiping the label onto the bottle, and means for imparting motion to said parts.

61. In a labeling machine, in combination, an open-bottom label-holder having screw-adjustable means for supporting a pack of labels thereon, a movable follower-plate adapted to rest upon said pack of labels within the label-holder, said follower-plate being free to move in one direction, an overhanging follower-arm with spring-controlled means affording resistance to the movement of said plate in opposite direction, and means for supporting said follower-arm in connection with the frame that carries said label-holder.

62. In a bottle-labeling machine, the combination, of a reciprocating, over-head open-bottom label-holder having screw-operated guiding supports for sustaining a pack of labels, a right and left threaded operating-screw for adjusting said supports, and means comprising paste-applying pickers adapted for pasting and for taking single labels therefrom by bottom delivery.

Witness my hand this twenty first day of April 1903.

FRANK O. WOODLAND.

Witnesses:
CHAS. H. BURLEIGH,
ELLA P. BLENUS.